March 6, 1945.  J. L. WADE  2,370,925
MOLD FOR BUTTER AND THE LIKE
Filed Aug. 2, 1940
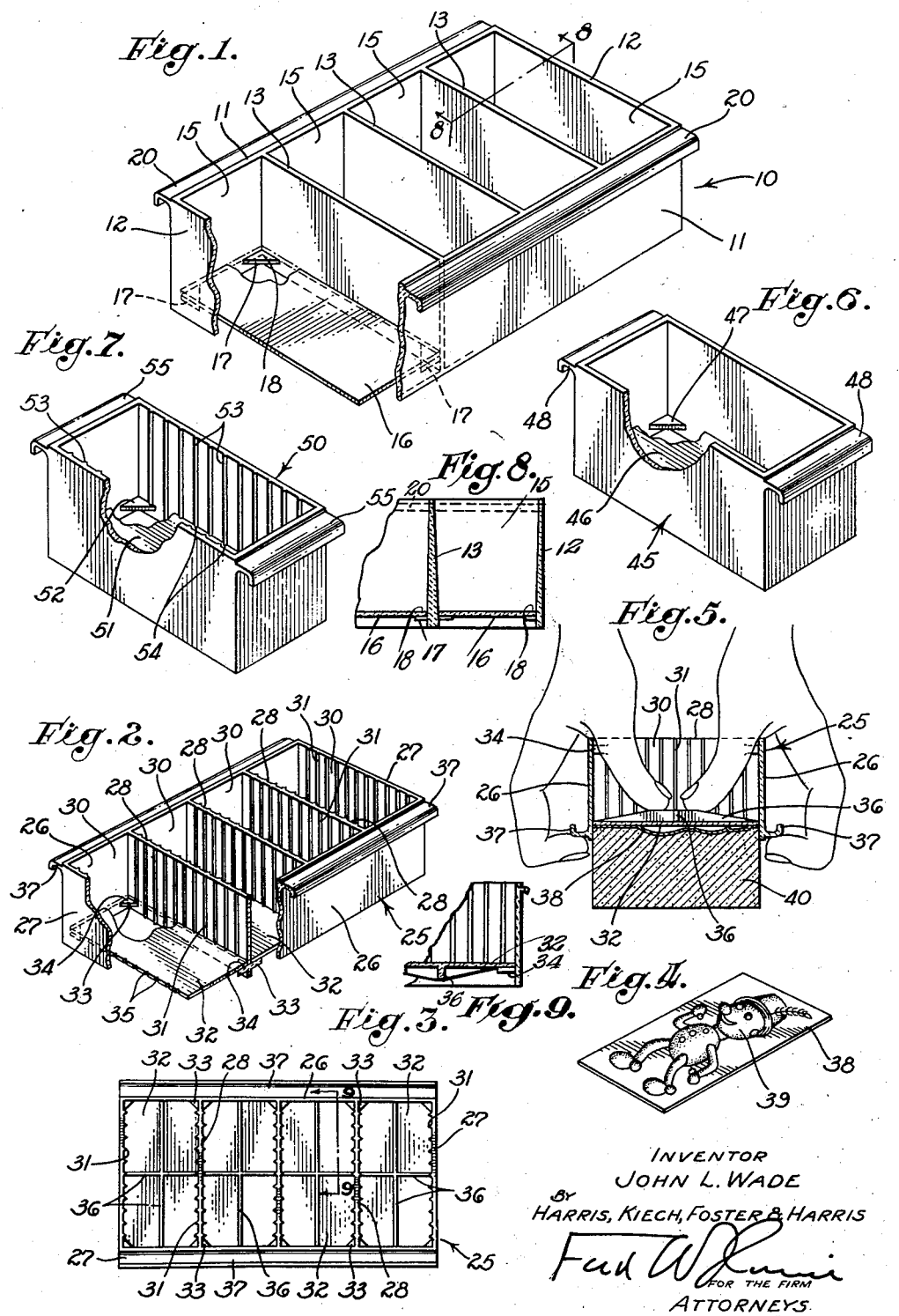
INVENTOR
JOHN L. WADE
BY
HARRIS, KIECH, FOSTER & HARRIS
ATTORNEYS Patented Mar. 6, 1945

2,370,925

UNITED STATES PATENT OFFICE 2,370,925

MOLD FOR BUTTER AND THE LIKE

John L. Wade, North Hollywood, Calif., assignor, by mesne assignments, of one-third to himself, one-third to Ray Swanson, both of Los Angeles, and one-third to William Wirt Lake, Pasadena, Calif.

Application August 2, 1940, Serial No. 349,500

8 Claims. (Cl. 31—42)

My invention relates to molds with special reference to molds for food products, and is directed specifically to a household device for molding butter, margarin, and like substances.

Butter, as one example of a food product to which my invention pertains, is commonly molded into quarter-pound blocks for the sake of pleasing and palatable appearance and to facilitate further subdivision into tabs for individual servings. If a housewife churns her own butter, or, more commonly, if the housewife uses one of the margarins requiring the admixture of coloring, occasions arise to form the product into the familiar rectangular blocks. In the absence of special devices for such purpose, the housewife may attempt to shape the plastic product into blocks by free-hand methods usually through the manipulation of a knife. A housewife cannot, however, expect to achieve the finished configuration of commercial butter blocks by such methods.

The general object of my invention is to provide a mold of simple and inexpensive construction suitable for use as a household device for forming butter and margarin products into blocks of conventional size. In one specific practice of my invention, I have the further object of providing a mold to form the product into conventional quarter-pound blocks with marks thereon to indicate lines of division for cutting the blocks into tabs for individual service.

In another practice of my invention it is my purpose to provide such a molding device in combination with interchangeable and replaceable molding inserts whereby selected designs may be impressed on the butter blocks.

My invention is characterized by a molding frame open at the top and bottom in combination with a separate bottom member dimensioned to move through the frame for the discharge of the molded product. In such a construction one object of the invention is to provide a mold that may be separated into easily cleaned members free of any inaccessible crevices. A further object is to provide such a construction that is adapted for convenient and rapid manipulation to discharge the molded product.

The above and other objects and advantages of my invention will be apparent in my more detailed description to follow, considered with the accompanying drawing.

In the drawing:

Fig. 1 is a perspective view, partly broken away, of one embodiment of my invention for molding a pound of butter, the device being shown as disposed for a molding operation;

Fig. 2 is a similar view of the same device provided with marking ribs;

Fig. 3 is a bottom view of the device of Fig. 2;

Fig. 4 is a perspective view of an ornamental molding insert that may be employed in the device of Fig. 2;

Fig. 5 is a view of the device of Fig. 2 in transverse section indicating the manual procedure of releasing the finished product from the mold;

Fig. 6 is a perspective view partly broken away of an embodiment of my invention designed to mold a quarter-pound block of butter;

Fig. 7 is a similar view of the same device with marking ribs added;

Fig. 8 is a fragmentary sectional view taken as indicated by the arrow 8—8 of Fig. 1; and Fig. 9 is a fragmentary sectional view taken as indicated by the arrow 9—9 of Fig. 3.

The form of my invention shown in Fig. 1 includes a rectangular molding frame generally designated 10 having side walls 11, end walls 12, and transverse partitions 13, the partitions dividing the frame into four compartments 15 of the size and configuration of convention quarter-pound blocks of butter. The top of each of the compartments 15 is open and the bottom of each of the compartments is open except for suitable projections to retain individual bottom plates 16 for the compartments. For example, each lower corner of each compartment may have a small triangular web 17 forming a shoulder 18 to support the corresponding corner of one of the bottom plates 16. The individual bottom plates 16 are dimensioned for clearance to permit them to be moved through the compartments.

Preferably the transverse partitions 13 are of slightly greater thickness at the bottom than the top, their vertical walls diverging downwardly, and the end walls 12 are slightly thickened at the bottom by sloping the inner surface of each downwardly and inwardly. In this manner suitable clearance is provided for the bottom plates 16 at the top of the partitions 13 and end walls 12 so that the plates 16 may be readily inserted in the frame 10, while the plates 16 fit snugly against the partitions 13 and end walls 12 when positioned upon the shoulders 18.

Preferably the molding frame 10 is provided with suitable handle means or finger grips in the form of longitudinal flanges 20 integral with the frame, the flanges being shaped and disposed as indicated.

The device shown in Figs. 2, 3, and 5 is similar to the device of Fig. 1, but in addition has means to form grooves in the sides of the quarter-pound blocks of molded butter to guide the operator in subsequently dividing the blocks into pats of butter for individual service. The device includes a rectangular frame generally designated 25 having side walls 26, end walls 27, and transverse partitions 28 dividing the frame into four compartments 30 of the size and configuration of conventional quarter-pound blocks of butter. The means for forming the grooves in the sides of the quarter-pound blocks of butter for subsequent guidance in dividing the blocks into individual pats may consists of numerous vertical ribs 31 in the two end walls 27 and the transverse partitions 28.

As in the first described construction, the top of each of the compartments 30 is open and the bottom of each of the compartments is open except for projections to retain individual bottom plates 32. Such projections are in the form of triangular webs 33 in each lower corner of each compartment forming shoulders 34 to support the corresponding corners of the bottom plates 32. The individual bottom plates 32 are dimensioned to move through the compartments in which they are to be employed, marginal notches 35 being provided in the bottom plates to clear the vertical ribs 31. Preferably the bottom plates 32 are of relatively light material and are each reinforced by two intersecting ribs 36. The molding frame 25 is preferably provided with suitable handles or finger grips in the form of longitudinal flanges 37 integral with the frame.

In one practice of my invention molding inserts, such as the insert 38 of Fig. 4, are placed in the bottoms of the compartments to form pleasing designs in the molded blocks. A design such as the design 39 of Fig. 4, for example, may be provided to make the molded blocks attractive to children. Such inserts are interchangeable and it is contemplated that a number of inserts will be provided for variety and that additional inserts with new designs may be made available from time to time. Since the inserts may be simple metal stampings or may be molded from plastics, the cost of forming new designs in the molded blocks will be small.

Both the device shown in Fig. 1 and the device shown in Figs. 2, 3, and 5 are employed in the same manner. In using the device with the vertical ribs, for example, the mold is first disposed in upright position as an open receptacle as indicated in Fig. 2 and is then filled to the brim with the butter or margarin, the material being well packed in the mold to avoid air pockets. After the mold is filled and the top surface of the material is smoothed down, the device is inverted by the operator for discharge of the molded blocks from the inverted frame by manual pressure against the bottom plates 32. Fig. 5 shows the fingers of the operator engaging the flanges 37 of the inverted frame 25 and the thumbs of the operator pushing downward on ribs 36 of one of the bottom plates 32. The operator pushes downward on the bottom plates 32 of the inverted mold in succession to discharge the successive molded blocks, Fig. 5 showing one of the molded blocks 40. The described procedure frees the rectangular frame 25 from the molded material and the frame may then be lifted away to leave the four blocks of butter on a support surface, each block being capped with one of the inverted bottom plates 32. The ribs 36 on the inverted bottoms of the bottom plates serve as convenient handles by means of which the bottom plates may be removed from the molded blocks.

If molding inserts 38 are inserted in the compartments 30 prior to the introduction of the material to be molded, the above described molding procedure is followed and the only additional operation required is the lifting away of the molding inserts from the molded blocks after the bottom plates 32 are removed.

Fig. 6 shows a single compartment mold suitable for molding a single quarter-pound block of butter. The device of Fig. 6 comprises an open rectangular frame 45 with a removable bottom plate 46 normally resting on triangular webs 47 in the corners of the frame. On opposite ends of the frame 45 flanges 48 are provided to serve as finger grips.

The device of Fig. 7, which is similar to that of Fig. 6, comprises a rectangular frame 50 with a removable bottom plate 51 resting on triangular webs 52. The two opposite sides of the frame 50 have inwardly projecting vertical ribs 53 to form grooves in the molded blocks for guidance in the subsequent division of the molded butter into individual pats. The bottom plate 51 is dimensioned for movement through the frame 50 and has marginal notches 54 to clear the ribs 53. The vertical frame 50 has the usual flanges 55 at opposite ends to serve as finger grips.

The smaller molds shown in Figs. 6 and 7 are used in the same general manner as previously described, each of the molds being packed with butter and then reversed for discharge of the molded butter block by thumb pressure exerted against the removable bottom plate. One of the molding inserts 38 may be used in molding butter or margarin with the devices shown in Figs. 6 and 7, if desired.

The illustrative forms of my invention described in specific detail herein will suggest to those skilled in the art various changes, modifications, and substitutions that do not depart from my underlying concept. I specifically reserve the right to all such changes, modifications, and substitutions that come within the scope of my appended claims.

I claim as my invention:

1. A mold for butter and like material, comprising: a rectangular molding frame open at the top and bottom; partitions dividing said frame into a plurality of open molding compartments; vertical ribs on said partitions to form dividing marks on bodies of material molded in said compartments and extending the full depth of said molding compartments; individual bottom members for each of said compartments dimensioned to move into said compartments through the open top of the frame and vice versa, said members having notches adapted to conform to and vertically slidably engage said ribs; projections on said frame adapted for supporting said bottom members by engagement with their corners, the bottom openings of said molding compartments being substantially unobstructed by said projections; and finger grips laterally projecting from said molding frame for lifting the mold when in upright position to invert it and for engagement by the fingers of an operator with the mold inverted whereby pressure may be applied to the outer surfaces of said bottom members by the two thumbs of the operator inserted through said bottom openings to push said bottom members through the inverted frame for discharge of molded material from the frame.

2. In a mold for butter and like material, the combination of: a molding frame open at top and bottom and providing molding surfaces; partitions dividing said frame into a plurality of open molding compartments and providing molding surfaces; forming means on said surfaces adapted for forming dividing marks on bodies of material molded in said frame as said bodies move vertically relative to said frame; thin individual bottom plates for each of said compartments so dimensioned as to be movable therein, said plates having edges shaped to conform to and vertically slidably engage said forming means; small projections on said surfaces adapted for supporting said bottom plates above the bottom of said frame, the open bottoms of said compartments being substantially unobstructed by said projections; and rib means on the lower surfaces of said bottom plates terminating above the bottom of said frame when said bottom plates are supported on said projections, and adapted to receive the pressure of the thumbs of the operator and to strengthen said bottom plates against flexure under said pressure and also adapted to serve as a finger grip for separating said bottom plates from blocks of material molded in said frame.

3. A mold for butter and like material, comprising: a molding frame open at the top and bottom; a bottom plate movable into and out of said frame; and triangular projections integral with and projecting inwardly from said frame at the corners thereof for supporting said bottom plate, the bottom opening of said frame being substantially unobstructed by said projections.

4. A mold for butter and like material, comprising: a molding frame open at the top and bottom; a bottom plate movable into and out of said frame; projections integral with and projecting inwardly from said frame at the corners thereof for supporting said bottom plate, the bottom opening of said frame being substantially unobstructed by said projections; and oppositely disposed ribs upon opposite walls of said molding frame adapted for forming dividing marks on a body of material molded in said frame, whereby said molded body removed from said frame may be quickly and accurately divided into a plurality of portions on division planes coinciding with such dividing marks, said bottom plate having oppositely disposed recesses adapted to conform to said ribs.

5. A mold for butter and like material, comprising: a molding frame open at the top and bottom; a bottom plate movable into and out of said frame; projections integral with and projecting inwardly from said frame at the corners thereof for supporting said bottom plate, the bottom opening of said frame being substantially unobstructed by said projections; and projections formed upon the bottom of said bottom plate and adapted for acting as finger grips to facilitate the separation of said bottom plate from the molded body after said plate and said body are expelled from said frame.

6. A mold for butter and like material, comprising: a molding frame open at the top and bottom; a thin bottom plate movable into and out of said frame; small projections on said frame adapted for supporting said bottom plate above the bottom of said frame, the bottom opening of said frame being substantially unobstructed by said projections; and a rib means on the lower surface of said bottom plate terminating above the bottom of said frame when said bottom plate is supported on said projections, said rib means being adapted to receive the pressure of the thumbs of the operator, and to serve as a finger grip for separating said bottom plate from a molded block of butter or like material, said rib means comprising a plurality of centrally intersecting ribs adapted to strengthen the bottom plate against flexure both longitudinally and transversely, and in addition thereto vertical ribs on the inner faces of the walls of said frame adapted for forming dividing marks on bodies of material molded in said frame, said bottom plate being formed with notches conforming to and vertically slidably engaging said ribs.

7. A mold for butter and like material, comprising: a molding frame open at the top and bottom; a thin bottom plate movable into and out of said frame; small projections on said frame adapted for supporting said bottom plate above the bottom of said frame, the bottom opening of said frame being substantially unobstructed by said projections; a rib means on the lower surface of said bottom plate terminating above the bottom of said frame when said bottom plate is supported on said projections, said rib means being adapted to receive the pressure of the thumbs of the operator and strengthen said bottom plate against flexure under said pressure, and to serve as a finger grip for separating said bottom plate from a molded block of butter or like material; vertically disposed ribs on the inner faces of the walls of said frame adapted for forming dividing marks on bodies of material molded in said frame, said bottom plate being formed with notches conforming to and vertically slidably engaging said ribs; and finger grips laterally projecting from the upper edges of said molding frame for lifting the mold when in upright position to invert it and for engagement by the fingers of an operator with the mold inverted, whereby pressure may be applied to the outer surface of said bottom plate by the two thumbs of the operator inserted through said bottom opening to push said bottom plate through the inverted frame member for discharge of molded material from the frame.

8. In a mold for butter and like material, the combination of: a mold frame having side and end molding surfaces and open at the top and bottom; a bottom member movable in said frame; small projections on said molding surfaces adapted for supporting said bottom member by engagement with its corners near the bottom of said frame, the bottom opening of said frame being substantially unobstructed by said projections; laterally extending oppositely disposed projections on said frame for lifting the mold when in upright position to invert it and for engagement by the fingers of an operator with the mold inverted whereby pressure may be applied to the outer surface of said bottom member by the two thumbs of the operator to push said bottom member through the inverted frame for discharge of molded material from the frame; and forming means on an oppositely disposed pair of said surfaces adapted for forming dividing marks on bodies of material molded in said frame member as said bodies move vertically relative to said frame member, said bottom member having an oppositely disposed pair of edges shaped to conform to and vertically slidably engage said forming means.

JOHN L. WADE.